US012711073B1

(12) United States Patent
Kauthale et al.

(10) Patent No.: US 12,711,073 B1
(45) Date of Patent: Aug. 18, 2026

(54) OPTIMIZING SMMU CACHE INVALIDATION

(71) Applicant: QUALCOMM Incorporated, San Diego, CA (US)

(72) Inventors: Swapnil Kailas Kauthale, Hyderabad (IN); Naresh Kumar Sharma, Hyderabad (IN); Debankan Roy, Kolkata (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 19/064,517

(22) Filed: Feb. 26, 2025

(51) Int. Cl.
*G06F 12/00* (2006.01)
*G06F 12/0891* (2016.01)

(52) U.S. Cl.
CPC ................................ *G06F 12/0891* (2013.01)

(58) Field of Classification Search
None
See application file for complete search history.

(56) References Cited

U.S. PATENT DOCUMENTS 7,836,259 B1 * 11/2010 Filippo ............... G06F 12/0862 711/137

* cited by examiner

*Primary Examiner* — Midys Rojas
(74) *Attorney, Agent, or Firm* — Gerald P. Joyce, III

(57) ABSTRACT

A system is provided for an improved cached STE invalidation. To track which STEs are updated, a memory is provided with a bitmap. Software identifies which STE are updated through the bitmap. Due to the update of the stored STE(s), corresponding STEs in a cache are stale. The software invalidates only the corresponding cached STEs as identified through the bitmap as opposed to invalidating all the cached STEs.

20 Claims, 5 Drawing Sheets

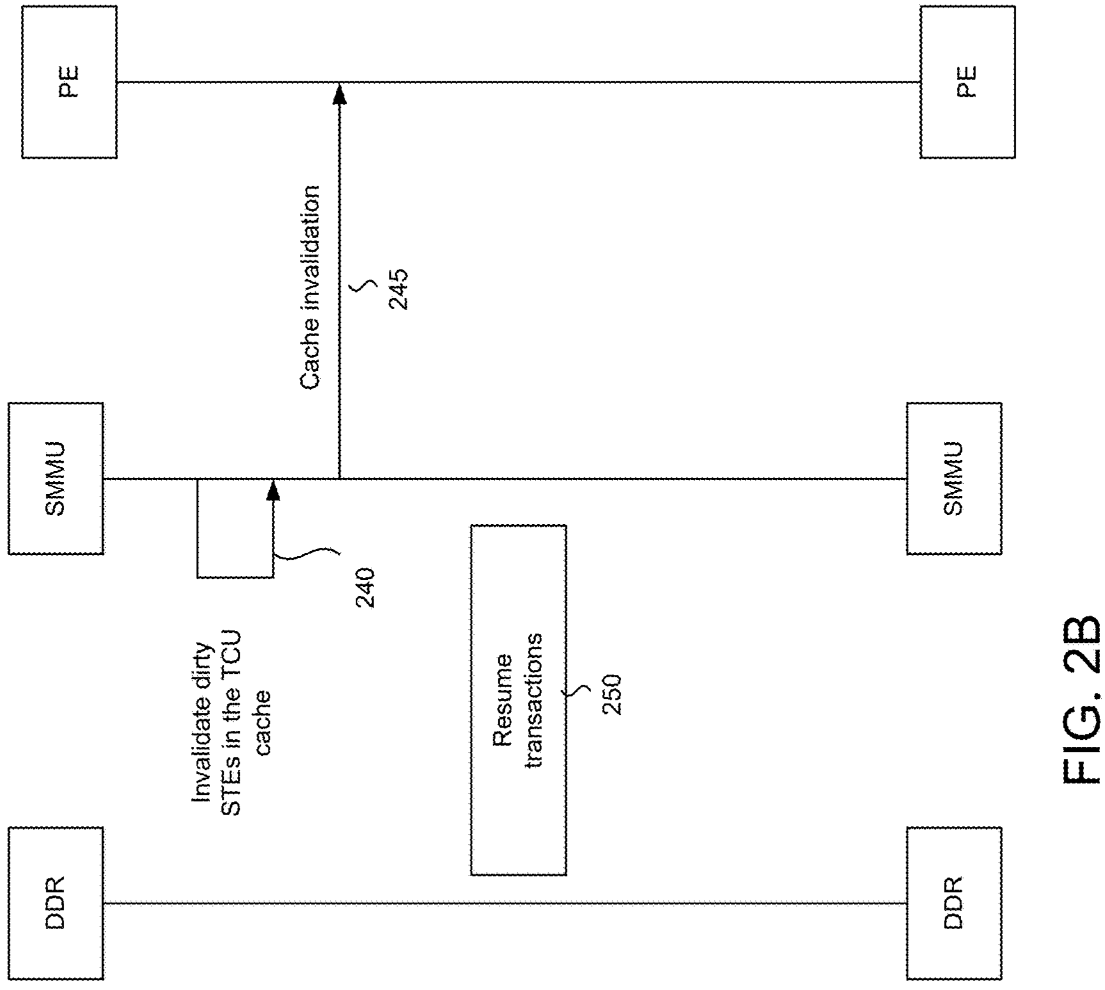
FIG. 2B
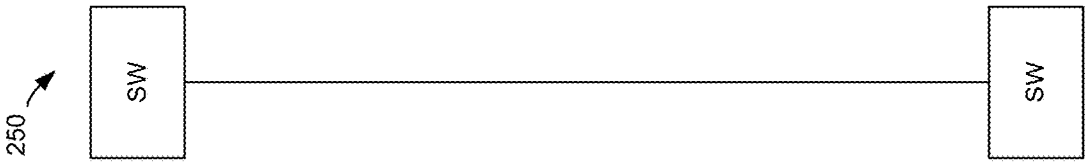

OPTIMIZING SMMU CACHE INVALIDATION

TECHNICAL FIELD

The present application relates generally to a system memory management unit (SMMU), and more particularly to optimizing an SMMU cache invalidation.

BACKGROUND

System-on-a-chip (SoC) devices may include one or more processors, coupled through a bus to one or more client devices (e.g., input/output devices). It is convenient for the client devices to address a system main memory such as a double data rate (DDR) dynamic random-access memory (DRAM) without the memory access passing through the processor(s) in what is denoted as a direct memory access. A system memory management unit (SMMU) assists in this direct memory access (DMA) by translating virtual addresses for DMA from the client devices into physical addresses for addressing the DDR DRAM. An SMMU is configured to perform this translation using memory-mapped configuration registers that define how the virtual-to-physical address translation should occur and also manage the access control.

To distinguish between address translations for client devices, the SMMU uses stream identification numbers (StreamIDs). In a simplest implementation, each client device has one StreamID. However, a single client device may have multiple StreamIDs corresponding to different translations in more complex implementations. For a given StreamID, the SMMU configures a stream table entry (STE), which is a 64-byte data structure that defines stage 1 and stage 2 pointers to the necessary translation tables for the StreamID.

Depending upon the client transactions, the SMMU caches STEs as retrieved from the DDR DRAM. In that regard, the DDR DRAM may store up to 65,000 STEs that are initialized at power up of the system. As the SMMU engages in client transactions, corresponding ones of the stored STEs from the DDR DRAM are retrieved and written to a processor element (PE) cache (and also to a translation control unit (TCU) cache). The sub-configuration structures of an STE such as Level 1 Context Descriptor (L1CD), Context Descriptor (CD), and Level 1 Stream Table Descriptor (L1STD) will also be cached in the PE and TCU caches. Whenever configuration (either in stage 1 or stage 2) for a stored STE in the DDR DRAM is updated, the operating system's software issues commands to clean the PE and TCU caches to include the updated STE entries. In that regard, the software may issue a "CMD_CFGI_ALL" that invalidates all STE configurations from the PE cache.

Even if just one or several STEs are amended and need updating, the software may issue the CMD_CFGI_ALL command. The invalidation of all the cached STEs is problematic because it requires the operating system hardware to look up the address range of each STE (approximately 65,000 STEs in total, each being 64 bytes) from the DDR memory and invalidate the cached copy accordingly, which causes substantial latency.

SUMMARY

In accordance with an aspect of the disclosure, a method of invalidating stream table entries (STEs) is provided that includes: caching STEs from a plurality of stored STEs stored in a memory into a cache so that the cache stores a plurality of cached STEs; initializing a bitmap in the memory, wherein the bitmap includes a bit for each stored STE in the plurality of stored STEs so that each bit in the bitmap has a first binary value; updating an at least one stored STE from the plurality of stored STEs to provide an at least one updated STE; changing a binary value of each bit in the bitmap corresponding to the at least one updated STE so that the bitmap includes an at least one changed bit having a second binary value; issuing a command to invalidate the plurality of cached STEs in response to the updating of the at least one stored STE; identifying each cached STE in the plurality of cached STEs that corresponds to the at least one changed bit to provide an at least one identified STE; and invalidating only the at least one identified STE in the plurality of cached STEs in response to the command to invalidate the plurality of cached STEs, wherein a remainder of the plurality of the cached STEs that does not include the at least one identified STE is not invalidated.

In accordance with another aspect of the disclosure, a system for invalidating stream table entries (STEs) is provided that includes: a memory configured to store a plurality of stored STEs; a cache configured to cache a plurality of cached STEs from the plurality of stored STEs; an at least one processor configured to: initialize a bitmap in the memory, wherein the bitmap includes a bit for each stored STE in the plurality of stored STEs so that each bit in the bitmap has a first binary value; update an at least one stored STE from the plurality of stored STEs to provide an at least one updated STE; change a binary value of each bit in the bitmap corresponding to the at least one stored STE so that the bitmap includes an at least one changed bit having a second binary value; and issue a command to invalidate the plurality of cached STEs in response to the update of the at least one stored STE; and a driver for a system memory management unit (SMMU) configured to: identify each cached STE in the plurality of cached STEs that corresponds to the at least one changed bit to provide an at least one identified STE; and invalidate only the at least one identified STE in the plurality of cached STEs in response to the command to invalidate the plurality of cached STEs, wherein a remainder of the plurality of the cached STEs that does not include the at least one identified STE is not invalidated.

Finally, in accordance with yet another aspect of the disclosure, a system for invalidating stream table entries (STEs) is provided that includes: a DDR memory configured to store a plurality of stored STEs and including means for flagging at least one stored STE in the plurality of stored STEs as being an at least one updated STE; an at least one processor configured to: update an at least one stored STE from the plurality of stored STEs to provide an at least one updated STE; and issue a command to invalidate a plurality of cached STEs stored in a cache in response to the update of the at least one stored STE; and a driver for a system memory management unit (SMMU) configured to: access the means to identify each cached STE in the plurality of cached STEs that corresponds to the at least one updated STE to provide an at least one identified STE; and invalidate only the at least one identified STE in the plurality of cached STEs in response to the command to invalidate the plurality of cached STEs, wherein a remainder of the plurality of the cached STEs that does not include the at least one identified STE is not invalidated.

These and other advantageous features may be better appreciated through the following detailed description.

BRIEF DESCRIPTION OF THE DRAWINGS

FIG. 2B illustrates a first portion of the invalidation process for the system of FIG. 1 in accordance with an aspect of the disclosure.

Implementations of the present disclosure and their advantages are best understood by referring to the detailed description that follows. It should be appreciated that like reference numerals are used to identify like elements illustrated in one or more of the figures.

DETAILED DESCRIPTION

As noted earlier, the DDR DRAM stores a relatively large number (approximately 65,000) of STEs. Since each STE is 65 bytes the resulting lookup of the STE address range from the DDR DRAM to identify the updated STEs and the subsequent invalidation of the cached STES so that the cached STEs are up to date introduces substantial latency, particularly because the CMD_CFGI_ALL is an atomic operation. In time-critical DMA use cases such as a splash screen display, USB charging live traffic, or Bluetooth playback, the issuance of a CMD_CFGI_ALL command may thus undesirably cause stalls, glitches or hangs. An ARM-architecture-based system is provided with an improved STE invalidation process. The system is particularly advantageous as the operating system software may continue to issue a CMD_CFGI_ALL command in response to a change in an STE configuration yet only the dirty STEs in the cache(s) are updated. As defined herein, a cached STE is deemed to be "dirty" when it is inconsistent with the corresponding stored STE in the DDR DRAM. The invalidation and update of the PE and TCU caches is thus advantageously faster, which saves power, increases operating speed, and prevents system crashes in time-critical operation.

Figure 1:
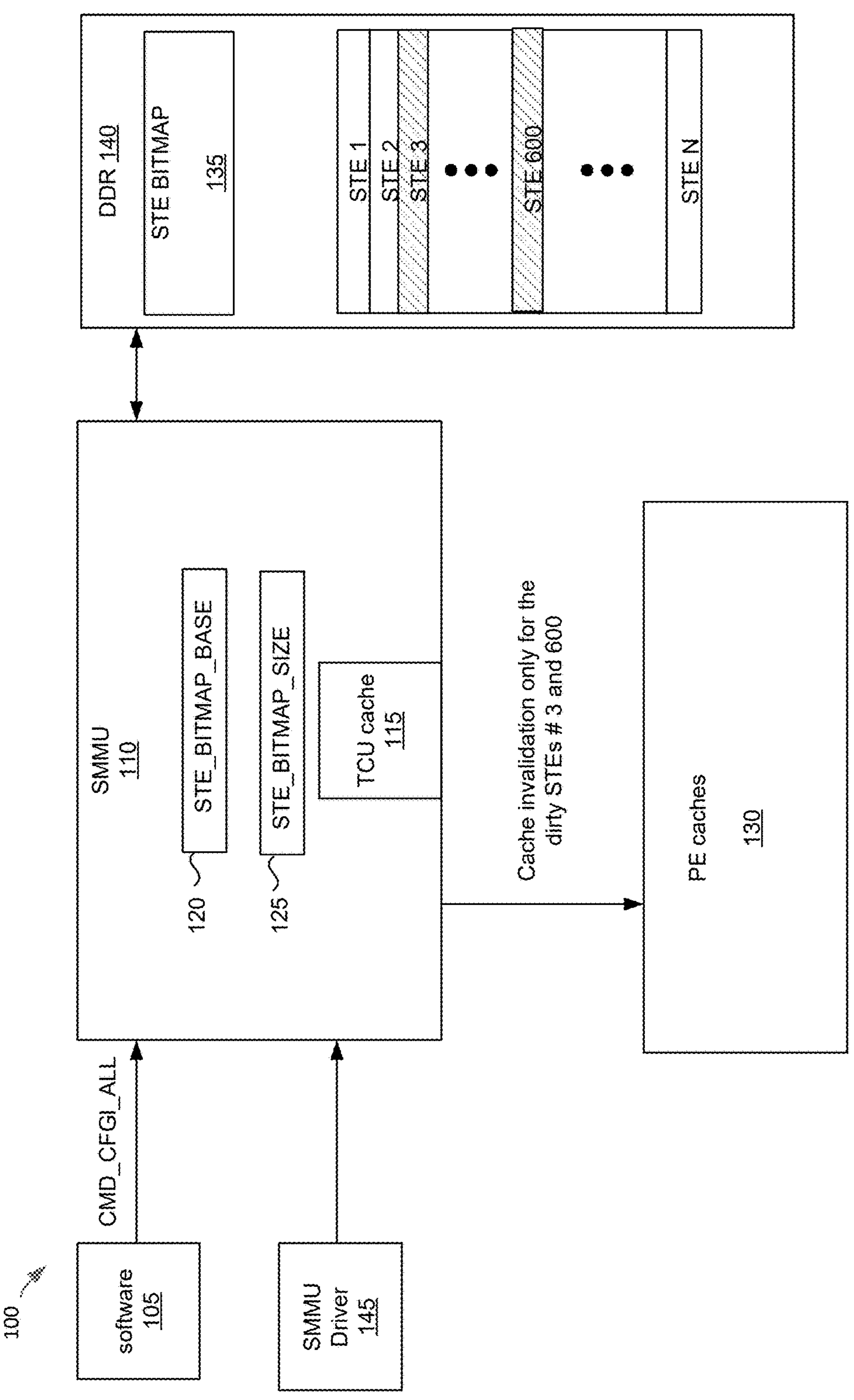
FIG. 1 illustrates a system having an improved invalidation of cached STEs in which a DDR memory includes a bitmap to identify which of the cached STEs is stale so that only the stale STEs are invalidated in accordance with an aspect of the disclosure.

An example system 100 is shown in FIG. 1. In the following discussion, it will be assumed that an SMMU such as an SMMU 110 is a Version 3 SMMU but it will be appreciated that the concepts disclosed herein are applicable to other versions. At power up of the system 100, software 105 (for example, an operating system software executed by an at least one processor as will be explained further herein) initializes a plurality of STEs in a DDR DRAM 140. There may be a total of approximately 65,000 STEs stored in the DDR DRAM 140. As the SMMU 110 engages in a plurality of N client transactions (N being a plural positive integer), the SMMU 110 is controlled by a SMMU driver 145 to cache N corresponding STEs from the DDR DRAM 140 to a TCU cache 115 and to a processor element (PE) caches 130. For illustration clarity, the DDR DRAM 140 is shown as only storing the N corresponding STEs, ranging from an STE 1 to an STE N but it will be appreciated that the DDR DRAM 140 is initialized with storage for up to approximately 65,000 STEs.

Depending upon the client transactions, the software 105 may update certain ones of the stored STEs in the DDR DRAM 140. In system 100, it is assumed that just an STE 3 and an STE 600 are updated from the N stored STEs. Due to this update, the TCU cache 115 and the PE caches 130 include stale cached versions of the STE 3 and STE 600 such that the software 105 issues the CMD_CFGI_ALL command. In a traditional system, the software 105 would then need to browse the address range of the approximately 65,000 STEs that may be stored in the DDR DRAM 140 so that the N cached STEs in the TCU cache 115 and the PE caches 130 may be updated accordingly, which results in substantial latency. To advantageously reduce this latency, the software 105 is configured to initialize an STE bitmap 135 in the DDR DRAM 135 that includes at least one bit for each of the N stored STEs. At initialization, each bit in the bitmap has a first binary value. For example, the initialization may be a reset of the bitmap such that the first binary value is a binary zero. In response to updates to the stored STEs in the DDR DRAM 140, the software 105 changes the binary values of the corresponding bits in the STE bitmap 135 so that the STE bitmap includes at least one changed bit having a second binary value. For example, the software 105 may set each at least one changed bit such that the second binary value is a binary one. Since it is assumed in system 100 that just the STE 3 and the STE 600 are updated, it would only be the corresponding bit for the STE 3 and the corresponding bit for the STE 600 that would be set by the software 105 in the STE bitmap 135.

Given the updates to the stored STEs 3 and STE 600 in the DDR DRAM 140, the corresponding configurations in the TCU cache 115 and the PE caches 130 are stale (dirty), which causes the software 105 to issue the CMD_CFGI_ALL command. Alternatively, the software 105 may issue a CMD_CFGI_STE_RANGE(N) command. In response, the software 105 accesses the STE bitmap 135 to identify which of the STEs has been updated. In this example, it is STE 3 and STE 600 that would be identified through the STE bitmap 135. To assist in the access of the STE bitmap 135, the software 105 may write a starting address of the STE bitmap 135 to a first register (STE_BITMAP_BASE) 120 in the SMMU 110. Similarly, the software 105 may write a size of the bitmap to a second register (STE_BITMAP_SIZE) 125 in the SMMU 110. With the updated STEs identified, the SMMU 110 as controlled by the SMMU driver 145 may proceed to invalidate only the identified STEs in the TCU cache 115 and the PE caches 130. These invalidated STEs are then updated so that the TCU cache 115 and the PE caches 130 are consistent with the updated STEs stored in the DDR DRAM 140.

Figure 2A:
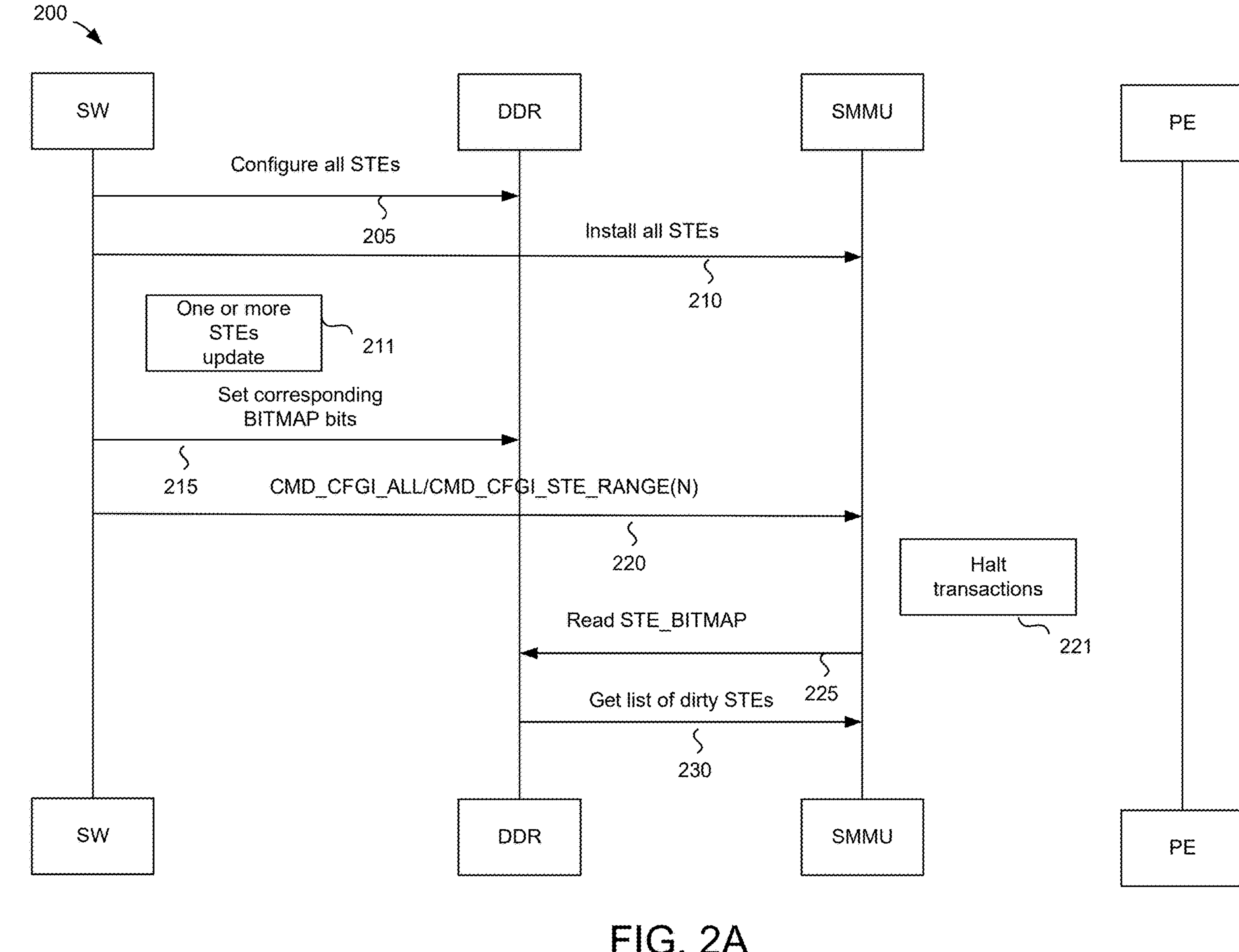
FIG. 2A illustrates a first portion of the invalidation process for the system of FIG. 1 in accordance with an aspect of the disclosure.

A process flow diagram for the cache invalidations in system 100 is shown in FIG. 2A and FIG. 2B. The process begins with a step 205 in which the software configures all the active STEs in the DDR DRAM. Similarly, the software caches all the active STEs in the corresponding caches in the SMMU in a step 210. At this point, the cached STEs in the caches are thus coherent (being consistent with) the stored STEs in the DDR DRAM. But then one or more STEs are updated in the DDR DRAM in a step 211 such that the corresponding ones of the cached STEs are stale/dirty. To identify which ones of the stored STEs in the DDR DRAM have been updated, the software sets the corresponding bits in the bitmap in a step 215.

Due to the update of at least one stored STE in the step 211, the software issues a command to invalidate all the cached STEs such as through issuing a CMD_CFGI_ALL command or a CMD_CFGI_STE_RANGE(N) command in a step 220. Such commands correspond to atomic operations so that the system halts all transactions in a step 221. The SMMU then reads the bitmap in a step 225 so that it may identify all the dirty cached STEs in a step 230. The SMMU may then invalidate only the dirty STEs in the TCU cache in a step 240 and invalidate only the dirty STEs in the PE caches in a step 245. With the caches now being coherent with the stored STEs in the DDR DRAM, the system may resume transactions in a step 250.

Figure 3:
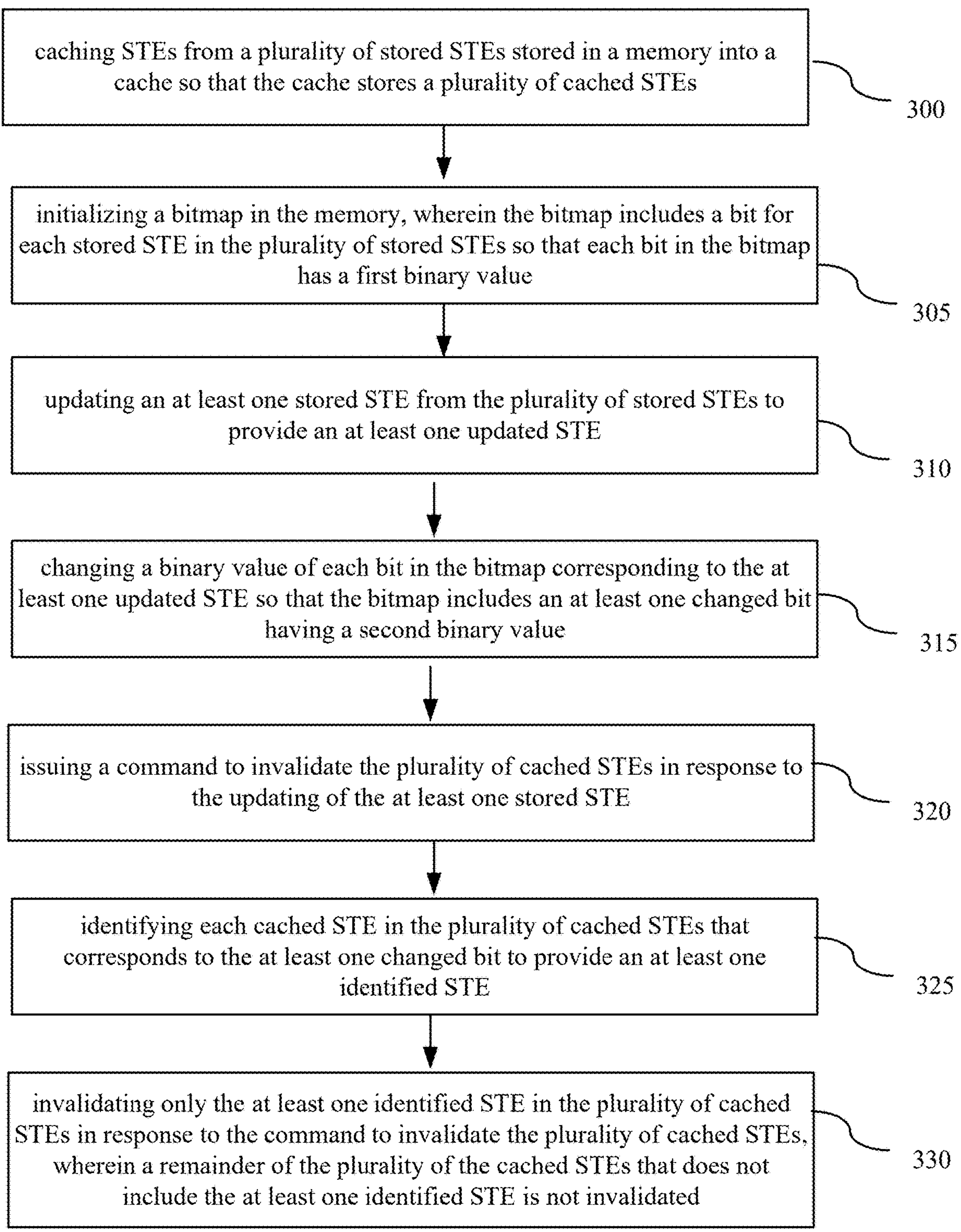
FIG. 3 is a flowchart for an example method of invalidating stale cached STEs in accordance with an aspect of the disclosure.

A method of invalidating cached STEs will now be discussed with respect to the flowchart of FIG. 3. The method includes an act 300 of caching STEs from a plurality of stored STEs stored in a memory into a cache so that the cache stores a plurality of cached STEs. The caching of cached STEs into the PE caches 130 or into the TCU cache 115 is an example of act 300. The method also includes an act 305 of initializing a bitmap in the memory, wherein the bitmap includes a bit for each stored STE in the plurality of stored STEs so that each bit in the bitmap has a first binary value. The initializing of the bitmap 135 is an example of act 305. In addition, the method includes an act 310 of updating an at least one stored STE from the plurality of stored STEs to provide an at least one updated STE. The updating of STEs 3 and 600 as discussed with regard to FIG. 1 is an example of act 310. The method also includes an act 315 of changing a binary value of each bit in the bitmap corresponding to the at least one updated STE so that the bitmap includes an at least one changed bit having a second binary value. The setting of the corresponding bits for STEs 3 and 600 in the bitmap 135 is an example of act 315. The method also includes an act 320 of issuing a command to invalidate the plurality of cached STEs in response to the updating of the at least one stored STE. The issuing of either the CMD_CFGI_ALL command or of the CMD_CFGI_SET_RANGE(N) command is an example of act 320. Moreover, the method includes an act 325 of identifying each cached STE in the plurality of cached STEs that corresponds to the at least one changed bit to provide an at least one identified STE. The use of the bitmap 135 to identify that the STEs 3 and 600 were updated is an example of act 325. Finally, the method includes an act 330 of invalidating only the at least one identified STE in the plurality of cached STEs in response to the command to invalidate the plurality of cached STEs, wherein a remainder of the plurality of the cached STEs that does not include the at least one identified STE is not invalidated. The invalidation of only the cached STEs 3 and 600 in the system 100 is an example of act 330.

Figure 4:
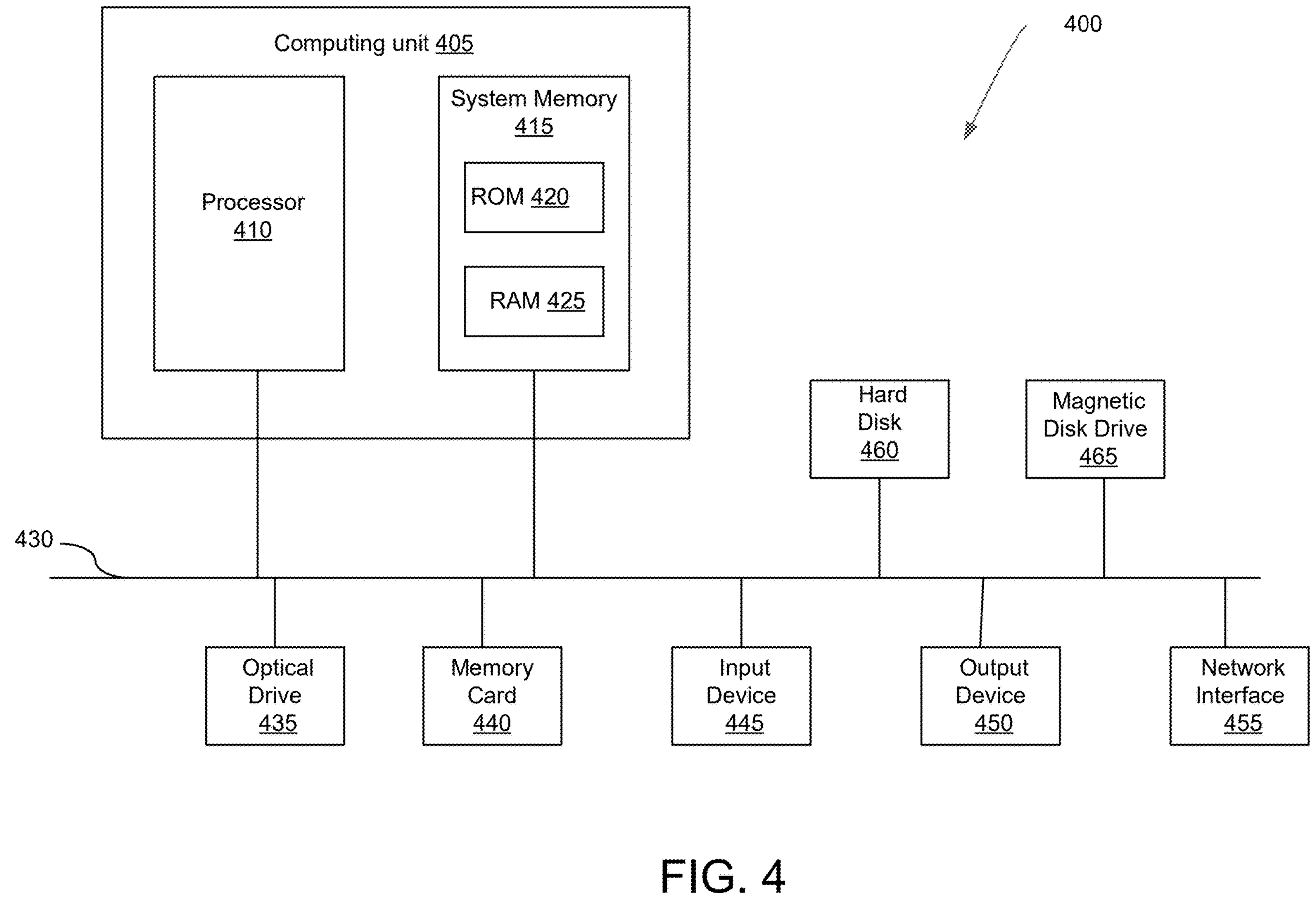
FIG. 4 illustrates an example computer system that is configured to practice the stale STE invalidation disclosed herein in accordance with an aspect of the disclosure.

Any suitable computing system may be used to implement an at least one processor configured with the software disclosed herein. An example computing system 400 that may be configured with the software 105 is shown in FIG. 4. As seen in this figure, the computing system 400 includes a computing unit 405 with an at least one processor 410 that executes instructions from and stores data in a system memory 415. The at least one processor 410 may be any type of programmable electronic device for executing software instructions but will typically be one or more microprocessors. The system memory 415 may include both a read-only memory (ROM) 420 and a random-access memory (RAM) 425. As will be appreciated by those of ordinary skill in the art, both the read-only memory (ROM) 420 and the random-access memory (RAM) 425 may store software instructions for execution by the at least one processor 410.

The at least one processor 410 and the system memory 415 are connected, either directly or indirectly, through a bus 430 or alternate communication structure, to one or more peripheral devices. For example, the at least one processor 410 or the system memory 415 may be directly or indirectly connected to one or more additional memory storage devices, such as a "hard" magnetic disk drive 460, a removable magnetic disk drive 465, an optical disk drive 435, or a flash memory card 440. The at least one processor 410 and the system memory 415 also may be directly or indirectly connected to one or more input devices 445 and one or more output devices 450. The input devices 445 may include, for example, a keyboard, a pointing device (such as a mouse, touchpad, stylus, trackball, or joystick), a scanner, a camera, and a microphone. The output devices 445 may include, for example, a monitor display, a printer and speakers. With various examples of the computer system 400, one or more of the peripheral devices 435, 440, 445, 460, and 465 may be internally housed within a housing of the computer system 400. Alternately, one or more of the peripheral devices 435, 440, 445, 460, and 465 may be external to the housing and connected to the bus 430 through, for example, a Universal Serial Bus (USB) connection.

With some implementations, the computing system 400 may be directly or indirectly connected to one or more network interfaces 455 for communicating with other devices making up a network. The network interface 455 translates data and control signals from the computer system 400 into network messages according to one or more communication protocols, such as the transmission control protocol (TCP) and the Internet protocol (IP). Also, the interface 455 may employ any suitable connection agent (or combination of agents) for connecting to a network, including, for example, a wireless transceiver, a modem, or an Ethernet connection. Such network interfaces and protocols are well known in the art, and thus will not be discussed here in more detail. It should be appreciated that the computing system 400 is illustrated as an example only, and it not intended to be limiting. Various implementations may be formed using one or more computing systems that include the components of the system 400 illustrated in FIG. 4 or which include only a subset of the components illustrated in FIG. 4, or which include an alternate combination of components, including components that are not shown in FIG. 4.

The disclosure will now be summarized through the following numbered clauses:

Clause 1. A method of invalidating stream table entries (STEs), comprising:

caching STEs from a plurality of stored STEs stored in a memory into a cache so that the cache stores a plurality of cached STEs;

initializing a bitmap in the memory, wherein the bitmap includes a bit for each stored STE in the plurality of stored STEs so that each bit in the bitmap has a first binary value;

updating an at least one stored STE from the plurality of stored STEs to provide an at least one updated STE;

changing a binary value of each bit in the bitmap corresponding to the at least one updated STE so that the bitmap includes an at least one changed bit having a second binary value;

issuing a command to invalidate the plurality of cached STEs in response to the updating of the at least one stored STE;

identifying each cached STE in the plurality of cached STEs that corresponds to the at least one changed bit to provide an at least one identified STE; and invalidating only the at least one identified STE in the plurality of cached STEs in response to the command to invalidate the plurality of cached STEs, wherein a remainder of the plurality of the cached STEs that does not include the at least one identified STE is not invalidated.

Clause 2. The method of clause 1, wherein issuing the command to invalidate the plurality of cached STEs comprises issuing a CMD_CFGI_ALL command.

Clause 3. The method of clause 1, wherein issuing the command to invalidate the plurality of cached STEs comprises issuing a CMD_CFGI_STE_RANGE(N) command, wherein N is an integer number of stored STEs in the plurality of stored STEs.

Clause 4. The method of any of clauses 1-3, further comprising:

writing the plurality of stored STEs to the memory prior to caching the plurality of cached STEs.

Clause 5. The method of any of clauses 1-4, wherein caching the plurality of cached STEs into the cache comprises caching the plurality of cached STEs into a processor element cache.

Clause 6. The method of any of clauses 1-5, further comprising:

invalidating a configuration from a translation control unit (TCU) cache for a system memory management unit (SMMU) responsive to the command to invalidate the plurality of cached STEs.

Clause 7. The method of clause 6, further comprising:

writing a starting address of the bitmap to a first register in the SMMU.

Clause 8. The method of clause 7, further comprising:

writing a size of the bitmap to a second register in the SMMU.

Clause 9. The method of clause 8, further comprising:

retrieving the starting address from the first register and retrieving the size of the bitmap from the second register; and reading from the bitmap responsive to the starting address and size of the bitmap to identify the at least one changed bit.

Clause 10. The method of any of clauses 1-9, wherein initializing the bitmap comprises resetting each bit in the bitmap, and wherein changing the binary value of each bit in the bitmap corresponding to the at least one updated STE comprises setting the at least one changed bit.

Clause 11. The method of any of clauses 1-10, wherein the memory comprises a double data rate (DDR) dynamic random-access memory (DRAM).

Clause 12. A system for invalidating stream table entries (STEs), comprising:

a memory configured to store a plurality of stored STEs;

a cache configured to cache a plurality of cached STEs from the plurality of stored STEs;

an at least one processor configured to:

initialize a bitmap in the memory, wherein the bitmap includes a bit for each stored STE in the plurality of stored STEs so that each bit in the bitmap has a first binary value;

update an at least one stored STE from the plurality of stored STEs to provide an at least one updated STE;

change a binary value of each bit in the bitmap corresponding to the at least one updated STE so that the bitmap includes an at least one changed bit having a second binary value; and issue a command to invalidate the plurality of cached STEs in response to the update of the at least one stored STE; and a driver for a system memory management unit (SMMU) configured to:

identify each cached STE in the plurality of cached STEs that corresponds to the at least one changed bit to provide an at least one identified STE; and invalidate only the at least one identified STE in the plurality of cached STEs in response to the command to invalidate the plurality of cached STEs, wherein a remainder of the plurality of the cached STEs that does not include the at least one identified STE is not invalidated.

Clause 13. The system of clause 12, wherein the at least one processor is further configured to issue a CMD_CFGI_ALL command to invalidate the plurality of cached STEs.

Clause 14. The system of clause 12, wherein the at least one processor is configured to issue a CMD_CFGI_STE_RANGE(N) command to invalidate the plurality of cached STEs, wherein N is an integer number of stored STEs in the plurality of stored STEs.

Clause 15. The system of any of clauses 12-14, wherein the at least one processor is further configured to:

write the plurality of stored STEs to the memory prior to the caching of the plurality of cached STEs.

Clause 16. The system of any of clauses 12-15, wherein the cache comprises a processor element cache.

Clause 17. The system of any of clauses 12-16, wherein the memory comprises a DDR DRAM.

Clause 18. A system for invalidating stream table entries (STEs), comprising:

a DDR memory configured to store a plurality of stored STEs and including means for flagging at least one stored STE in the plurality of stored STEs as being an at least one updated STE;

an at least one processor configured to:

update an at least one stored STE from the plurality of stored STEs to provide an at least one updated STE; and issue a command to invalidate a plurality of cached STEs stored in a cache in response to the update of the at least one stored STE; and a driver for a system memory management unit (SMMU) configured to:

access the means to identify each cached STE in the plurality of cached STEs that corresponds to the at least one updated STE to provide an at least one identified STE; and invalidate only the at least one identified STE in the plurality of cached STEs in response to the command to invalidate the plurality of cached STEs, wherein a remainder of the plurality of the cached STEs that does not include the at least one identified STE is not invalidated.

Clause 19. The system of clause 18, wherein the DDR memory comprises a DDR DRAM.

Clause 20. The system of clause 18, wherein the cache comprises a plurality of processor element caches.

As those of some skill in this art will by now appreciate and depending on the particular application at hand, many modifications, substitutions and variations can be made in and to the materials, apparatus, configurations and methods of use of the devices of the present disclosure without departing from the scope thereof as defined by the appended claims. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A method of invalidating stream table entries (STEs), comprising:

caching STEs from a plurality of stored STEs stored in a memory into a cache so that the cache stores a plurality of cached STEs;

initializing a bitmap in the memory, wherein the bitmap includes a bit for each stored STE in the plurality of stored STEs so that each bit in the bitmap has a first binary value;

updating an at least one stored STE from the plurality of stored STEs to provide an at least one updated STE;

changing a binary value of each bit in the bitmap corresponding to the at least one updated STE so that the bitmap includes an at least one changed bit having a second binary value;

issuing a command to invalidate the plurality of cached STEs in response to the updating of the at least one stored STE;

identifying each cached STE in the plurality of cached STEs that corresponds to the at least one changed bit to provide an at least one identified STE; and invalidating only the at least one identified STE in the plurality of cached STEs in response to the command to invalidate the plurality of cached STEs, wherein a remainder of the plurality of the cached STEs that does not include the at least one identified STE is not invalidated.

2. The method of claim 1, wherein issuing the command to invalidate the plurality of cached STEs comprises issuing a CMD_CFGI_ALL command.

3. The method of claim 1, wherein issuing the command to invalidate the plurality of cached STEs comprises issuing a CMD_CFGI_STE_RANGE(N) command, wherein N is an integer number of stored STEs in the plurality of stored STEs.

4. The method of claim 1, further comprising:

writing the plurality of stored STEs to the memory prior to caching the plurality of cached STEs.

5. The method of claim 1, wherein caching the plurality of cached STEs into the cache comprises caching the plurality of cached STEs into a processor element cache.

6. The method of claim 1, further comprising:

invalidating a configuration from a translation control unit (TCU) cache for a system memory management unit (SMMU) responsive to the command to invalidate the plurality of cached STEs.

7. The method of claim 6, further comprising:

writing a starting address of the bitmap to a first register in the SMMU.

8. The method of claim 7, further comprising:

writing a size of the bitmap to a second register in the SMMU.

9. The method of claim 8, further comprising:

retrieving the starting address from the first register and retrieving the size of the bitmap from the second register; and accessing the bitmap responsive to the starting address and size of the bitmap to identify the at least one changed bit.

10. The method of claim 1, wherein initializing the bitmap comprises resetting each bit in the bitmap, and wherein changing the binary value of each bit in the bitmap corresponding to the at least one stored STE comprises setting the at least one changed bit.

11. The method of claim 1, wherein the memory comprises a double data rate (DDR) dynamic random-access memory (DRAM).

12. A system for invalidating stream table entries (STEs), comprising:

a memory configured to store a plurality of stored STEs;

a cache configured to cache a plurality of cached STEs from the plurality of stored STEs;

an at least one processor configured to:

initialize a bitmap in the memory, wherein the bitmap includes a bit for each stored STE in the plurality of stored STEs so that each bit in the bitmap has a first binary value;

update an at least one stored STE from the plurality of stored STEs to provide an at least one updated STE;

change a binary value of each bit in the bitmap corresponding to the at least one stored STE so that the bitmap includes an at least one changed bit having a second binary value; and issue a command to invalidate the plurality of cached STEs in response to the update of the at least one stored STE; and a driver for a system memory management unit (SMMU) configured to:

identify each cached STE in the plurality of cached STEs that corresponds to the at least one changed bit to provide an at least one identified STE; and invalidate only the at least one identified STE in the plurality of cached STEs in response to the command to invalidate the plurality of cached STEs, wherein a remainder of the plurality of the cached STEs that does not include the at least one identified STE is not invalidated.

13. The system of claim 12, wherein the at least one processor is configured to issue a CMD_CFGI_ALL command to invalidate the plurality of cached STEs.

14. The system of claim 12, wherein the at least one processor is configured to issue a CMD_CFGI_STE_RANGE(N) command to invalidate the plurality of cached STEs, wherein N is an integer number of stored STEs in the plurality of stored STEs.

15. The system of claim 12, wherein the at least one processor is further configured to:

write the plurality of stored STEs to the memory prior to a caching of the plurality of cached STEs.

16. The system of claim 12, wherein the cache comprises a processor element cache.

17. The system of claim 12, wherein the memory comprises a DDR DRAM.

18. A system for invalidating stream table entries (STEs), comprising:

a DDR memory configured to store a plurality of stored STEs and including means for flagging at least one stored STE in the plurality of stored STEs as being an at least one updated STE;

an at least one processor configured to:

update an at least one stored STE from the plurality of stored STEs to provide an at least one updated STE; and issue a command to invalidate a plurality of cached STEs stored in a cache in response to the update of the at least one stored STE; and a driver for a system memory management unit (SMMU) configured to:

access the means to identify each cached STE in the plurality of cached STEs that corresponds to the at least one updated STE to provide an at least one identified STE; and invalidate only the at least one identified STE in the plurality of cached STEs in response to the command to invalidate the plurality of cached STEs, wherein a remainder of the plurality of the cached STEs that does not include the at least one identified STE is not invalidated.

19. The system of claim 18, wherein the DDR memory comprises a DDR DRAM.

20. The system of claim 18, wherein the cache comprises a plurality of processor element caches.

* * * * *